United States Patent
Roka

(10) Patent No.: US 7,983,718 B1
(45) Date of Patent: Jul. 19, 2011

(54) WIRELESS PHONES WITH KEYS DISPLAYING IMAGE FILES

(75) Inventor: Pujan K. Roka, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 907 days.

(21) Appl. No.: 11/974,271

(22) Filed: Oct. 11, 2007

(51) Int. Cl.
*H04B 1/38* (2006.01)

(52) U.S. Cl. ............... 455/566; 455/550.1; 455/564; 379/202.01; 348/14.02; 348/14.09; 348/211.12

(58) Field of Classification Search ............ 455/564, 455/566, 550.1; 379/88.13, 202.01, 204.01, 379/203.01, 205.01; 348/14.08, 14.09, 14.1, 348/21.12, 211.13
See application file for complete search history.

(56) References Cited

U.S. PATENT DOCUMENTS

| 5,818,361 A | 10/1998 | Acevedo | |
|---|---|---|---|
| 7,130,394 B2 * | 10/2006 | Koyama et al. | 379/93.23 |
| 2002/0149568 A1 | 10/2002 | Kim | |
| 2004/0146272 A1 * | 7/2004 | Kessel et al. | 386/46 |
| 2005/0273494 A1 * | 12/2005 | Uchide | 709/204 |
| 2007/0186002 A1 * | 8/2007 | Campbell et al. | 709/231 |
| 2008/0068447 A1 * | 3/2008 | Mattila et al. | 348/14.08 |

OTHER PUBLICATIONS

Richards, Geoff, *World's first keyboard with LCD keys*, bit-tech.net, Sep. 19, 2005.
Jitterbug Phones: Easy Emergency Cell Phones, http://www.Jitterbug.com/phones.aspx (2007), Admitted Prior Art.
Lg Migo (VX1000) Phone (Verizon Wireless-Mobiledia, http://mobiledia.com/phones/Ig/migo/html (2007) Admitted Prior Art.

* cited by examiner

*Primary Examiner* — Kamran Afshar
*Assistant Examiner* — Vladimir Magloire

(57) ABSTRACT

A wireless telephone includes one or more keys incorporating a programmable display. The display may display an image file (e.g., a photo of a parent or friend), such as a photo captured by a camera incorporated into the telephone. The image file may be displayed directly on the key or it may be cropped or downsampled as appropriate. The user interface allows the user to program the key to dial a particular telephone number. In one embodiment, during a multi-party conference call the keys display images of the conference call participants. The participant currently speaking can be displayed on a main display of the phone. When the conference call is over, the key displays revert back to their previous display state.

15 Claims, 9 Drawing Sheets

WIRELESS PHONES WITH KEYS DISPLAYING IMAGE FILES

BACKGROUND

A. Field

This invention relates generally to the field of wireless telephones and more particularly to wireless telephones incorporating one or more keys which take the form of a programmable display. The display is constructed such that it may display image files. Such image files may include photographs either captured locally by a camera included in the phone or image files sent to the phone over a network connection.

B. Related Art

Wireless telephone manufacturers and service providers have developed relatively simple to use wireless telephones, with a minimum of buttons. These phones include the "Jitterbug OneTouch" phone, described at www.jitterbug.com/phones.aspx. The Jitterbug phone includes three speed dial buttons, one of which can selected at the factory to dial read either "friend", "home", "tow", "work" or "my phone". The other two buttons read "operator" and "911".

Another phone is the LG Migo phone from Verizon Wireless, which is designed to be used by kids between 8 and 12 years of age. A description of the LG Migo phone can be found online. The LG Migo phone includes four speed dial buttons labeled "1", "2", "3" and "4" which can be programmed to dial four different numbers.

Other relevant art related to this invention includes Kim, US Patent Publication 2002/0149568 and Acevedo, U.S. Pat. No. 5,818,361. These references describe computer keyboards in which the individual keys include display capabilities. A story about these new keyboards was published on Sep. 19, 2005, see "World's First keyboard with LCD Keys", by Geoff Richards, available online.

This invention provides for a novel wireless telephone and method of operation which provides for improved usability of a wireless telephone using keys which include a programmable display for displaying image files, e.g., photographs.

SUMMARY

In a first aspect, a wireless telephone is disclosed which includes telephone circuitry for placing and receiving wireless telephone calls. The telephone also includes a key which is operative by a user to place a call using the telephone circuitry. The key may be associated with a speed dial function, such that a pressing of the key automatically causes the phone to place a call to a telephone number associated with the key. The key includes a programmable display for displaying an image file. The display may, for example, take the form of a liquid crystal display (LCD) or other format, arranged as a plurality of pixels arranged in rows and columns. The display of the key is programmable so as to display an image selected by the user. The image that is displayed may be a thumbnail or similar small size photographic image, depending on the size of the key. An image file, such as a digital photograph of a person the user frequently calls, is displayed on the key display either directly or indirectly. That is, the image file may be converted to a format for display on the key display, e.g., downsampled so that the number of pixels in the image is the same as that of the LCD display.

The phone further includes a memory storing machine readable instructions. The instructions allow a user to select an image file stored in the memory for presentation on the programmable key display.

In one embodiment, the telephone further includes a camera. The image file stored in memory and used for display on the key display is a photograph that is captured by the camera built into the phone. For example, a photograph may be taken of a friend or family member. The photograph is then presented in miniature form on the key display. When the user presses the key display, the telephone automatically calls the family member. As such, the key having the programmable display may be associated with a speed dial function. All that is needed to initiate a call to the family member is to turn on the phone and press the image of the family member displayed on the key.

In one possible variation, the image file stored in memory may take the form of a video (motion picture) file, e.g., an .mpeg file. The instructions in the memory cause a still image from the video file to be presented on the key. For example, the video file is presented on the main display of the phone and the user stops the video file at the point where they want to select a still image for display on the key. After the user has selected the still image, the still image is displayed on the key. When the user presses the key later on, e.g., to place a call to a telephone number associated with the key, the instructions then cause the still image to begin moving in accordance with video file.

In one embodiment, the telephone includes a plurality of keys, such as three or four of such keys, and each key has its own a programmable display for displaying an image file.

In one embodiment the key having the programmable display takes the form of a hard key—i.e., a physical button separate from the main display of the telephone. In another possible embodiment, the key is a "soft key" and is integrated into the main display. For example, the main display may include a touch sensitive screen and a portion of the display is devoted to one or more soft keys, e.g., speed dialing keys. The user programs the phone such that each of the one or more soft keys displays a separate image file (e.g., a spouse, the home, the office, a friend). The user presses the image of the office to call the office, etc.

The telephone and image display features of this invention make a telephone very simple to use. As such, the invention can be incorporated into telephones specifically designed and promoted for use by children or the elderly. In the case of a phone marketed to children, the process of programming the phone to display the photo of one of the parents on a given key and program the key to dial a particular number would typically be performed by the parent. However, after this initial set up, all the child would have to do to operate the phone is to turn it on and press the photo of the parent to dial him or her.

The keys with programmable displays can also used in a conference call function to display image files of conference call participants. An image of each conference participant is associated with a separate key in the plurality of keys. Thus, in a three-way conference call and the phone has at least two keys with associated displays, one key would display an image of one of the other conference participants and the other key would display an image of the third conference participant. As a further enhancement of this feature, the telephone includes a main display. The instructions incorporated into the telephone receive data during the conference identifying a participant in the conference currently speaking. The telephone responsively presents the image associated with the conference participant currently speaking on the telephone's main display.

In another aspect, a method is disclosed of facilitating a user of a wireless telephone to place a call from the telephone to a third party. The telephone includes a key having an associated programmable display. The key provides a speed dial function in which a press of the key causes a dialing of a phone number. The method includes the steps of:

a) providing a prompt instructing the user to assign an image file to the display associated with the key;

b) providing a prompt instructing the user to assign a phone number to the key;

c) providing instructions in the telephone which cause the image file to be displayed on the display; and d) providing telephone circuitry in the phone which places the call to the assigned phone number when the user activates the key.

In one embodiment, the method may further include the steps of providing a camera with the telephone and a memory for storing image files of photographs captured by the camera. The prompt a) prompts the user to select a image file from the stored images files. As noted above, the key could comprise hard keys on the telephone, or the key could be integrated into the main display. More than one key can be included in the phone and the prompts a), b) and c) allow each key to display a different image file.

Additionally, the phone may further include a conference call functionality. The method may further comprise the step of temporarily disabling the display of the image file on the key (or keys) when the conference call functionality is invoked on the phone. In this aspect, the method may further include a step of displaying an image file of a conference call participant on the display of the key during the conference call. When the conference call is ended, the keys revert back to display of the same image files that were presented before the conference call was invoked.

In yet another aspect, a wireless telephone is disclosed comprising telephone circuitry for placing and receiving wireless telephone calls, a main display, a key separate from the main display wherein the key includes a programmable display for displaying an image file, and a memory storing machine readable instructions. The instructions include instructions for displaying an image file of a conference call participant on the programmable display when the wireless telephone is engaged in a conference call with the conference call participant. In one variation the instructions detect when the conference participant is speaking during the conference call and responsively cause the image of the conference participant to be displayed on the main display.

These and still other aspects of the invention will be more fully understood from the following detailed description and consideration of the appended drawing figures.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF PREFERRED EMBODIMENTS

Figure 1:
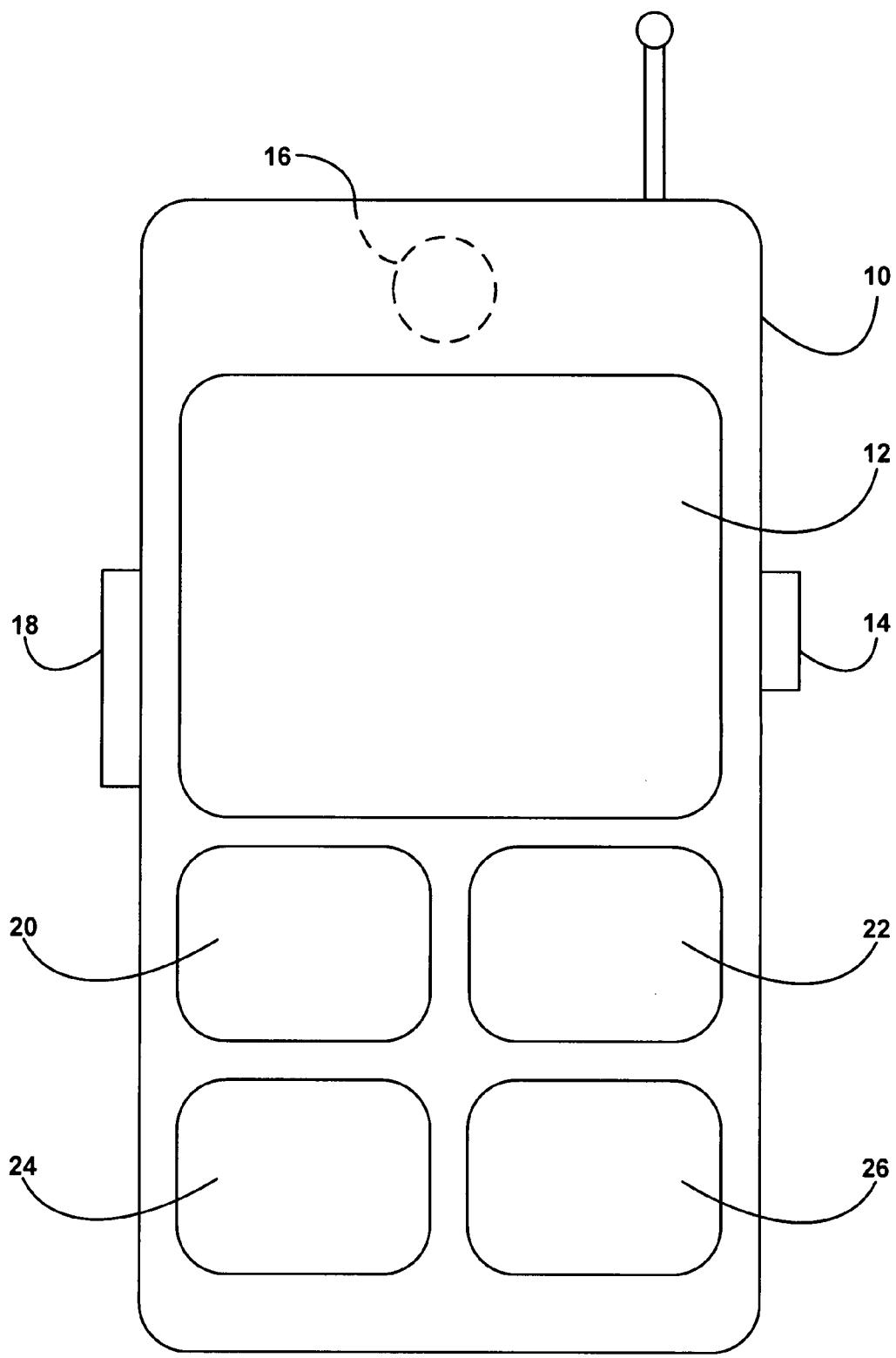
FIG. 1 is an illustration of a wireless telephone having a main display and four hard keys, each key having a programmable display which is capable of displaying an image file.

Referring now to FIG. 1, there is shown a wireless telephone 10. The telephone 10 includes a main display 12, a camera key 14 which when pressed causes a camera 16 to take a photograph and store the photograph in memory as an image file, a volume dial 18 which allows the volume of a speaker in the phone to be adjusted, and four hard keys 20, 22, 24 and 26, each having an associated configurable (programmable) digital display.

The wireless telephone 10 includes telephone circuitry for placing and receiving wireless telephone calls. The circuitry is not shown in FIG. 1 but is conventional and well known in the cellular telephone art. Such circuitry may take the form of CDMA or GSM wireless receive and transmit circuitry in accordance with known telecommunications standards, such as ITU-T International Standard IS-41 or the like. The circuitry is shown as element 200 in FIG. 8, which will be described later on.

The display associated with the keys 20, 22, 24 and 26 may take the form of a Liquid Crystal Display (LCD) or any other suitable format. The key display itself is not shown as a separate element in the drawing figures; rather, in the illustrated embodiments it is basically coextensive with the physical key 20, 22, 24 and 26. Thus, in the following discussion the term "key" and "display" are used interchangeably unless the context clearly indicates otherwise.

The key display is typically organized into rows and columns of picture elements (pixels). An image file resident in a memory in the telephone is represented on the displays associated with the keys 20, 22, 24 and 26, either directly, or indirectly by conversion into a smaller format (e.g., thumbnail), cropping the image, converting the image to a different format, or by some other process the details or which are not particular important and known to persons in the art. The source image file for use in displaying on the keys 20, 22, 24 and 26 may come from the camera 16 or may be downloaded to the phone from a network connection.

Figure 8:
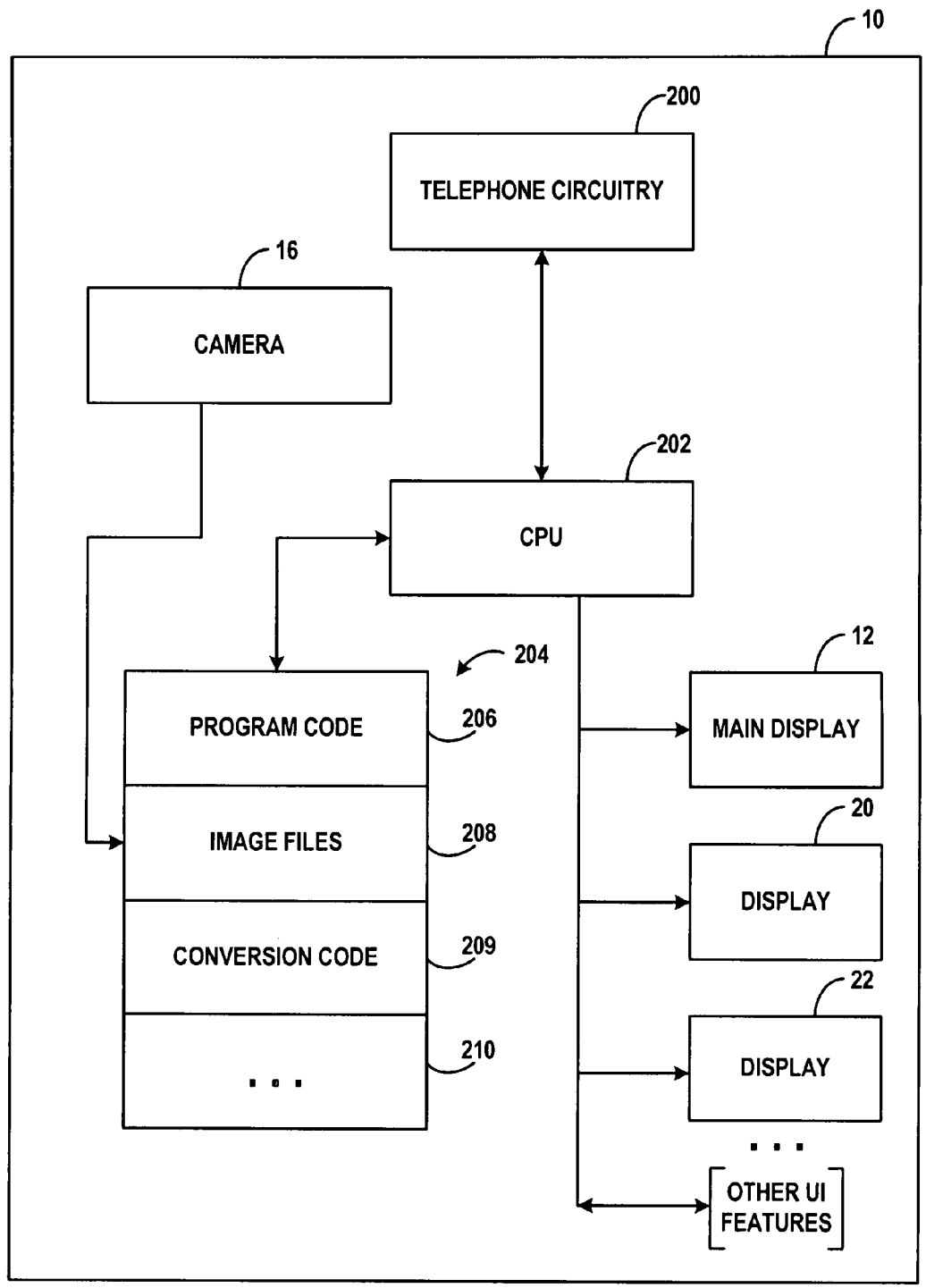
FIG. 8 is a simplified block diagram of the phone of FIG. 1 or FIG. 2 showing one possible collection of electronic components used to provide the functionality shown in FIGS. 1-7. The specific details are not particularly important and can vary widely.

The keys 20, 22, 24 and 26 are operative by a user of the telephone to place a call using the telephone circuitry 200 of FIG. 8. For example, the keys 20, 22, 24 and 26 may each be associated with a speed dial function. To place a call, the phone is turned on and then the key 20, 22, 24 or 26 is pressed whereupon a call is initiated to the person whose image is displayed on the respective key that is pressed.

Figure 2:
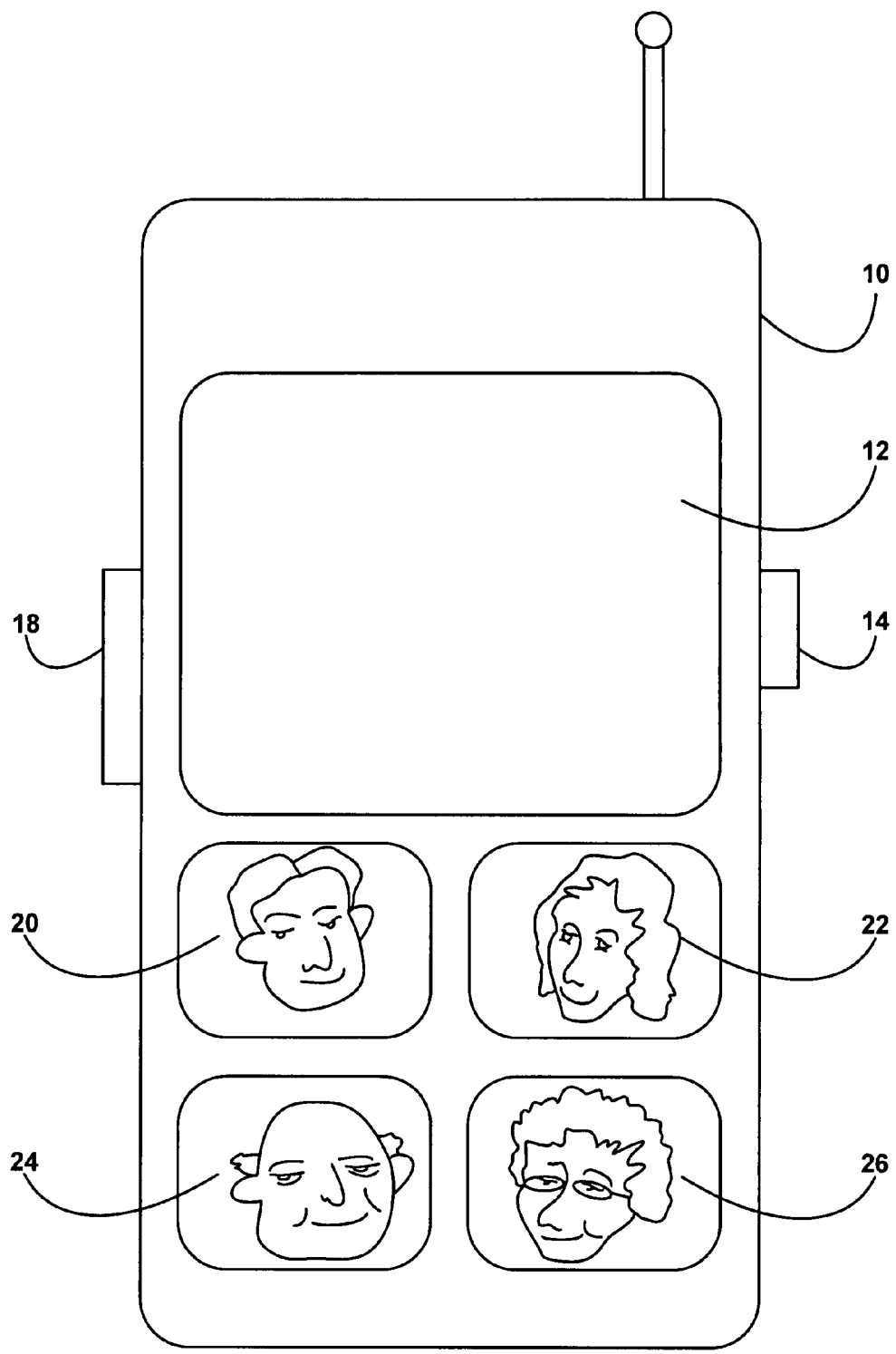
FIG. 2 is an illustration of the phone of FIG. 1, after the user has gone through a process of selecting an image for display on each of the four keys and programming each key with a phone number. When the user presses a particular key the phone automatically dials the person whose image is displayed on the key.

The phone 10 further includes a memory storing machine readable instructions for execution by a processing unit (CPU) in the telephone. The instructions allow a user of the phone to select an image file stored in the memory for presentation on one of the programmable displays 20, 22, 24 and 26. The memory is not shown in FIG. 1 but is shown in the phone block diagram of FIG. 8 as element 204. Referring to FIG. 2, the phone contains four image files—mom, dad, grandma and grandpa. The image files could be obtained by taking pictures of the subjects using the camera 16 of FIG. 1. The user has programmed the phone such that the photo of dad is displayed on key 20, the photo of mom is displayed on key 22, the photo of grandpa is displayed on key 24 and the photo of grandma is displayed on key 26. The user (in this instance a child) only has to press key 20 to call dad (at work, for example). The set up function will also require the user to program each key 20, 22, 24 and 26 with a phone number. This will be explained in conjunction with FIGS. 3 and 4B.

Figure 3:
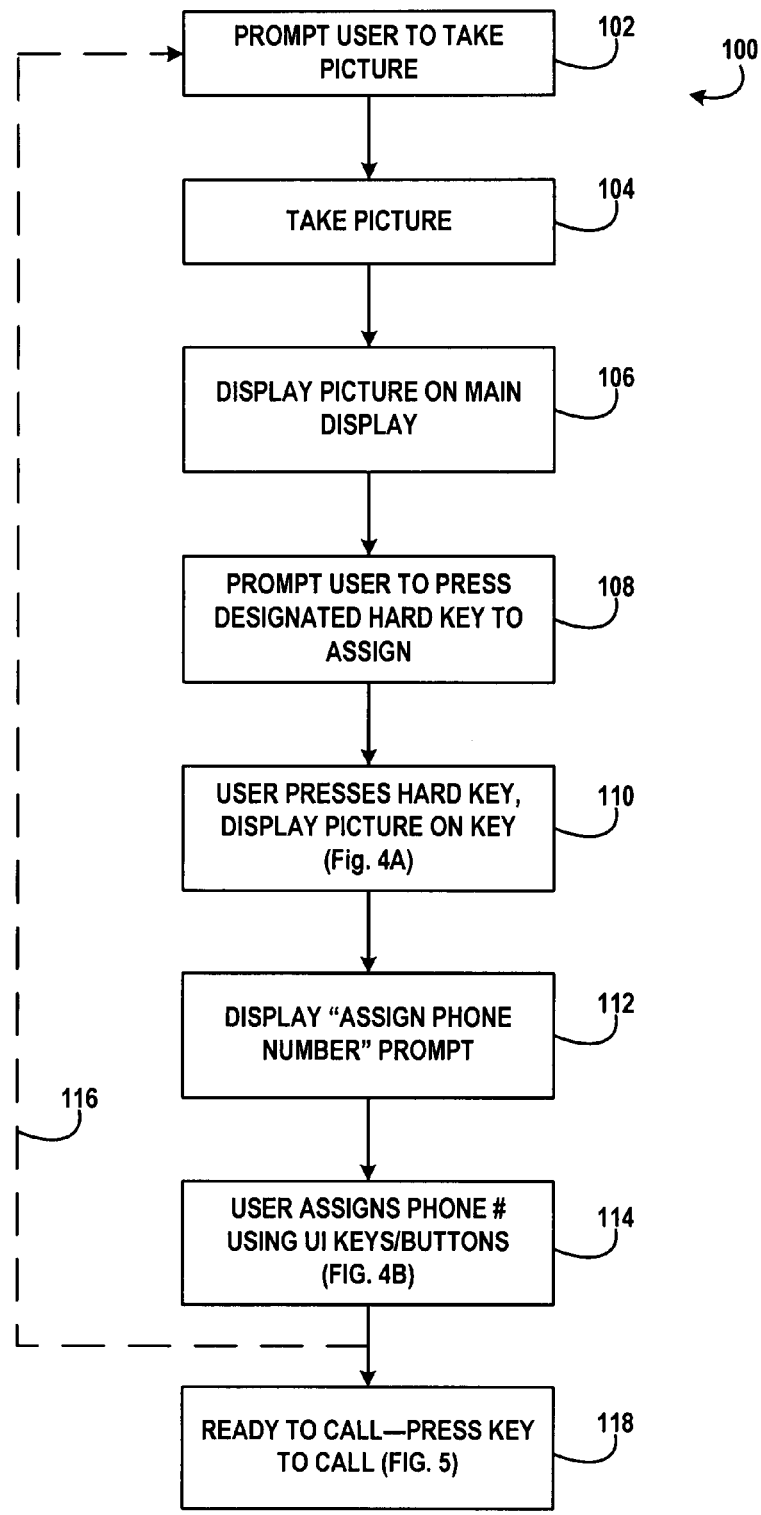
FIG. 3 is a flow chart showing a process of setting up one of the keys shown in FIG. 2.

An example of how the set-up instructions might be coded in the memory of the telephone will be described in conjunction with FIG. 3. FIG. 3 is a flowchart showing a process 100 of setting up one of the keys 20, 22, 24 or 26 shown in FIG. 2.

At step 102, the user navigates to a set up page using the user interface features of the phone and the main display displays a prompt to the user to take a picture of a subject (person or place) which is to be eventually associated with one of the keys. At step 104, the user takes the picture of the subject, e.g., dad. At step 106, the picture that was taken is displayed in the main display region 12 of the phone 10. At step 108, the user is prompted to press a hard key which they wish to associate with the displayed image. Then at step 110 the user presses key 24. See FIG. 4A. For example of a photo of grandpa, the user presses key 24.

At step 112, the main display 12 displays an "assign phone number prompt" and the user is prompted to enter a phone number to associate with the photo of dad.

At step 114, the user assigns a phone number to the photo using the user interface features of the phone. The specific manner this is done is not particularly important and can vary. With reference to the example of FIG. 4B, the display shows a scrollable list of digits from 0 to 9, and the user operates the volume key 18 to scroll up or down to the desired digit. The highlighted number ("2" in FIG. 2) is then selected by pressing the button 14. The entered digit is shown on the lower portion of the display 12 and the process continues until all 10 digits of the phone number are entered. The user thus goes through this process to enter the phone number of the person whose image is displayed on the key 24.

As indicated by the arrow 116 in FIG. 3, the user can repeat the process 100 and thereby program a second or subsequent key.

The process of FIG. 3 may be modified without departure from the scope of the invention. For example, the steps 102 and 104 may be omitted or replaced by a step that simply prompts the user to select an image stored in memory, whereupon step 106 and the remaining steps 108, 110, 112, and 114 are performed.

Figure 5:
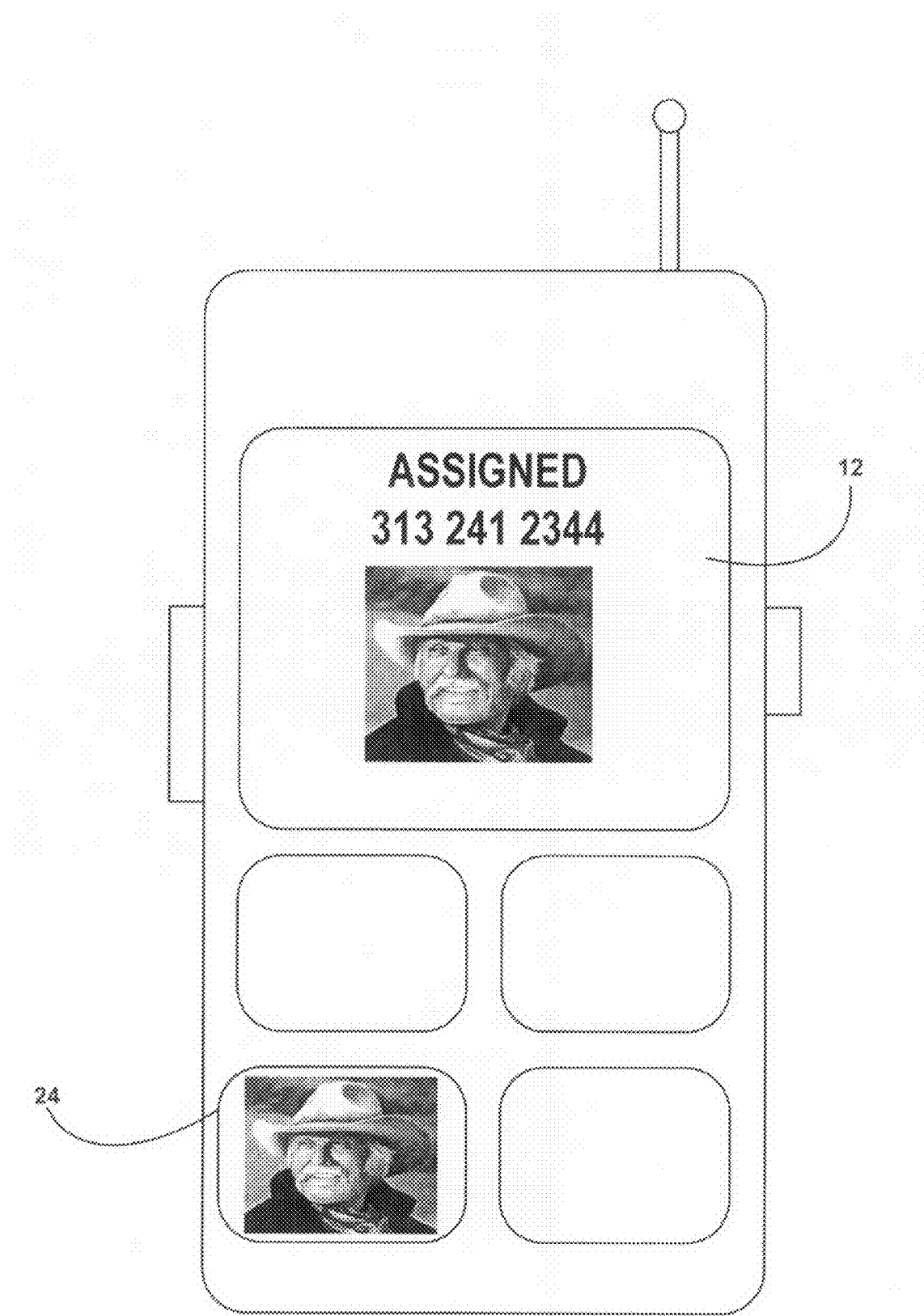
FIG. 5 shows the main display of the phone showing the phone number that was assigned to a particular image, with the image displayed on one of the keys (key 24).

When the user has finished programming a particular key 20, 22, 24 or 26, the phone is now ready to speed dial the person shown on a given key, step 118 in FIG. 3. The main display 12 may show a message after the programming is complete such as shown in FIG. 5, showing the user which number is assigned to the person depicted in key 24. The user may be able to access the assignment shown in FIG. 5 using some other shortcut key, e.g., pressing another button on the phone while pressing the key 24, or in some other fashion.

Figure 6:
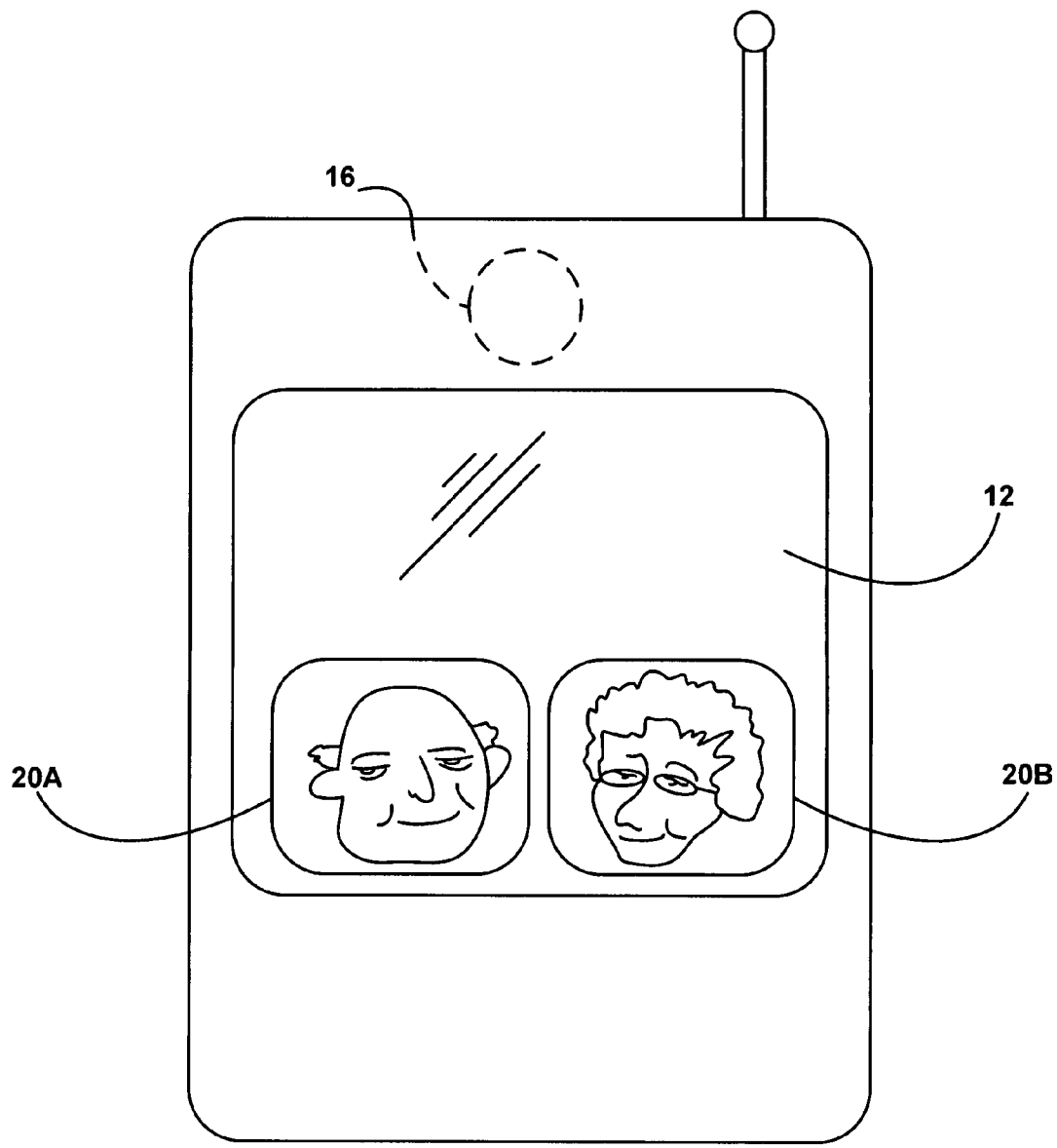
FIG. 6 is an illustration of an alternative arrangement of the telephone in which the keys associated with the speed dialing function are incorporated into the main display. Each key or region of the display has its own display of an image. When the user presses the key (e.g., key 20A) the phone dials the person shown in the image for that key.

While the examples of FIGS. 1-5 have shown separate hard keys each having its own display, the keys can be incorporated into the main display 12. As shown in FIG. 6, the main display 12 includes a portion thereof 20A which is set up and operated as a speed dial key and a thumbnail image file of a person (e.g., grandpa) is shown presented on the key 20A. Similarly, key 20B shows an image of another person that the user may frequently call. The display 12 in this instance is touch sensitive. The keys may be activated by pressing the keys 20A or 20B with a finger, a stylus, or other implement. The manner of setting up the key would generally be the same as previously described. The operation of the phone of FIG. 6 would be the same as previously described. That is, after the person selects the image file to be presented on the key 20A or 20B, the user programs the phone to associate a particular phone number with the key. When the user presses the key (e.g., key 20A) the phone dials the person shown in the image for that key. The display 12 may allow for more than two keys with programmable displays. Again, the source image file to use in the keys 20A or 20B may need to be cropped, downsampled or converted into another format to fit the number of pixels available for the keys 20A and 20B.

FIG. 8 is a simplified block diagram of a wireless telephone which performs the functions described above. The phone 10 includes conventional telephone circuitry 200 for placing and receiving wireless telephones. This circuitry is known and therefore a more detailed description is omitted for the sake of brevity. The phone includes a processing unit (microprocessor or central processing unit) 202 which executes program instructions 206 stored in a memory 204. The operation of the program instructions is as described in this document. The phone 10 includes a camera 16 which generates digital images which are stored in the memory 204 as image files 208. The memory may also include conversion code 209 for converting one image file format to another, to downsample image files, crop image files, or perform other conversion functions in order that the image file selected for display on the keys (e.g., 20 or 20a) has the correct pixel count or other format to fit the key display. Other routines or functions may be present in the memory, indicated at 210. The CPU 202, executing the program instructions, causes the appropriate displays and messages to be displayed on the main display 12 and the appropriate image files 208 (either raw or as converted by conversion code 209) on the key displays 20, 22, etc. The CPU may also receive commands or input from other user interface elements or features, such as the on-off switch, volume controls, camera trigger switch, etc. As noted above, the particular details of the camera electronics are not particularly important and can vary widely without departure from the scope of this invention.

Figure 4A:
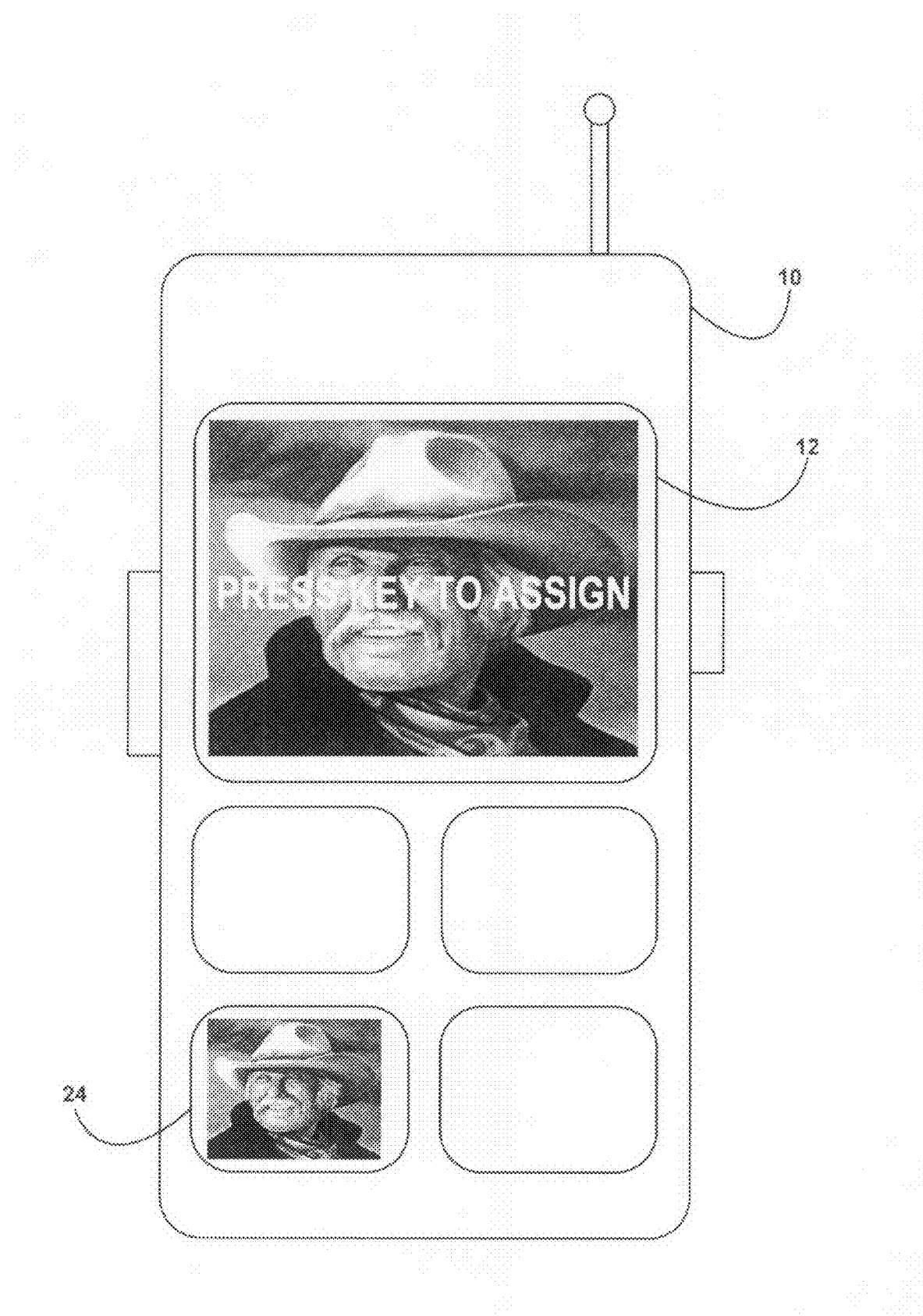
FIGS. 4A and 4B shows examples of steps in the flow chart of FIG. 3 whereby the user selects a hard key to assign to a photograph (FIG. 4A) and programs a telephone number to be associated with a particular key and image (FIG. 4B).
Figure 4B:
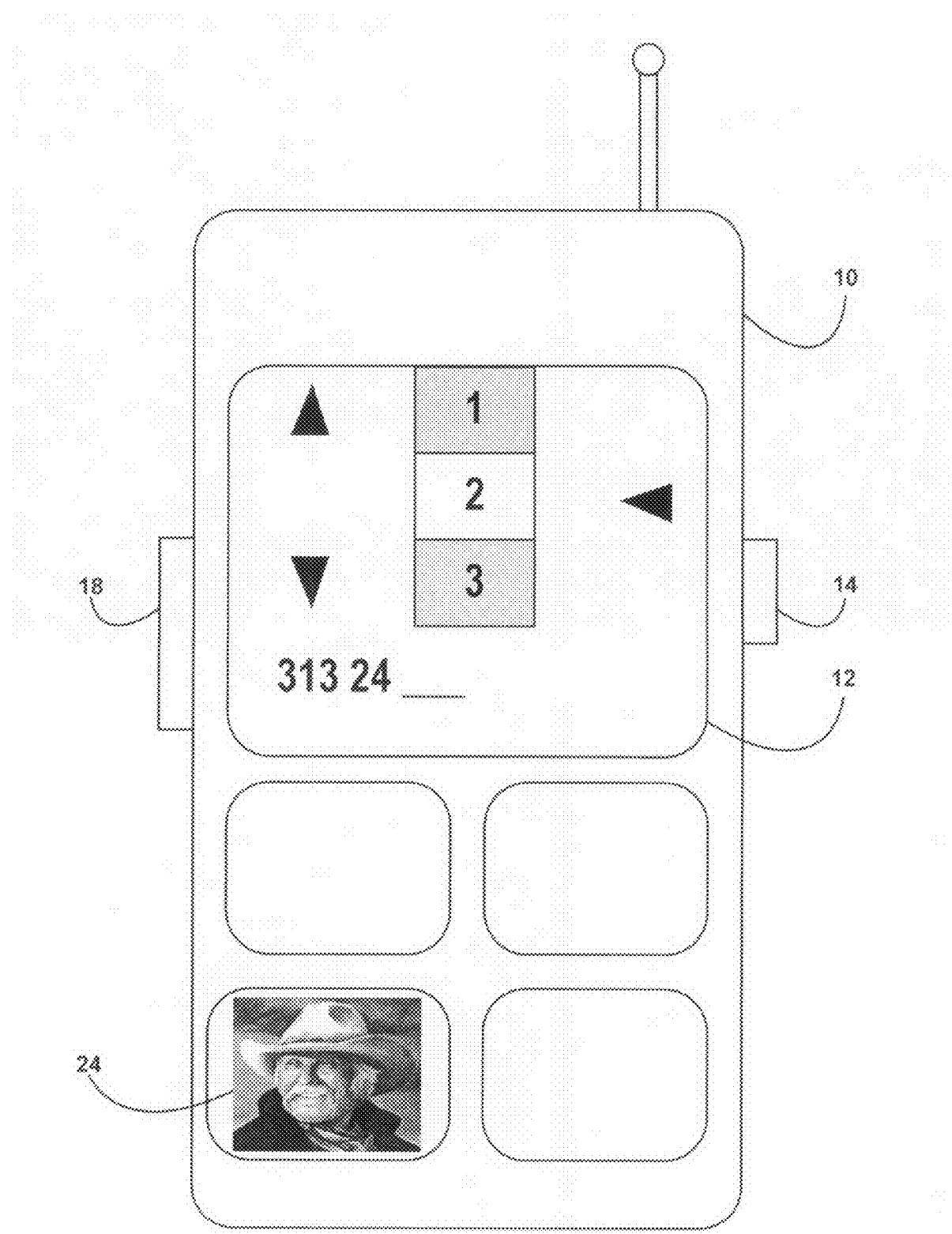

From the above description, it will be appreciated that a method of facilitating a user of a wireless telephone 10 to place a call from the telephone to a third party has been described. The telephone 10 includes a key (e.g., 20 or 20A) having an associated programmable display, the key providing a speed dial function in which a press of the key causes a dialing of a phone number. The method comprising the steps of:

a) providing a prompt instructing the user to assign an image file to the display associated with the key (FIG. 4A);

b) providing a prompt instructing the user to assign a phone number to the key (FIG. 5);

c) providing instructions in the telephone which cause the image file to be displayed on the display (FIG. 2, 4, 5, 6); and d) providing telephone circuitry 208 (FIG. 8) in the phone which places the call to the assigned phone number when the user activates the key (e.g., 20, 20A).

The method may further include the step of providing a camera 16 with the telephone 10 and a memory 204 for storing image files 208 of photographs captured by the camera. The prompt in step a) (FIG. 4) may prompt the user to select an image file from the stored images files consisting of photos taken by the camera.

Video Files

In one embodiment of the phone of FIG. 1 or FIG. 6, the image file that is stored in memory and used to generate an image on the key takes the form of a video (moving picture) file. The instructions 206 in the phone allow the user to select the video file and the video begins to play on the main screen. The user stops the video file at any convenient point. At that point, the frame of video is saved in memory. The user then presses a particular hard key (FIG. 1) or soft key (FIG. 6) to associate the still image (frame) with the selected hard key as in the case of FIG. 4A. Thus, the instructions cause a still image from the video file to presented on the key. In one variation, when the user later on selects that particular key, the instructions 206 cause the still image displayed on the key to begin moving in accordance with the video file. In another variation, the still image begins moving on the main display 12. The display of the moving image on the key (20) or on the main display 12 may be accompanied with a dialing of a person who is associated with the still image and key that has been pressed.

Conference Call Features

The keys which display images as described above can be extended to conference call scenarios. In particular, the telephone can include instructions which support a conference call function on the phone. Additionally, the phone receives a digital file in the form of an image of each conference participant, e.g., during set up of the conference. The image of each conference participant is associated with a separate key 20, 22, 24 or 26 (FIG. 1). Furthermore, the telephone receives data during a conference identifying a participant in the conference currently speaking. In response, the instructions responsively present the image associated with the conference participant currently speaking on the main display 12 of the phone.

Figure 7:
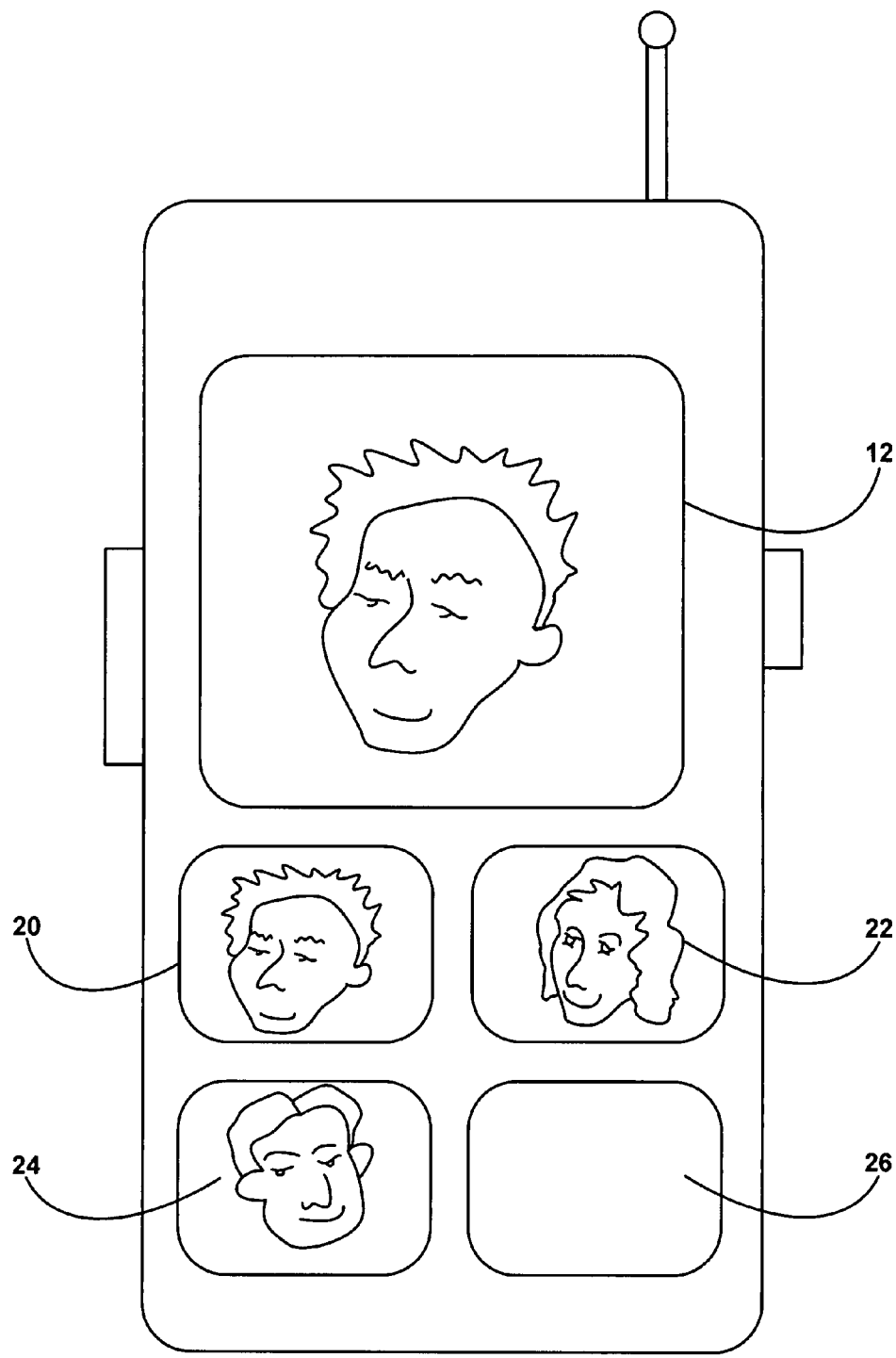
FIG. 7 is an illustration of an embodiment of the invention in which images of the participants in a conference call are displayed on the various keys. The image of the person currently speaking is displayed on the main display.

FIG. 7 is an illustration of an embodiment of the invention in which images of the participants in a conference call are displayed on various keys 20, 22 and 24. The image of the person currently speaking is displayed on the main display 12.

One embodiment of how this aspect might be implemented is as follows. If, for example, there are four keys 20, 22, 24 and 26 each with programmable displays and the user presses a button or activates an icon indicating it is about to engage in a conference call, any previous image displays for the keys are temporarily removed/disabled. As the conference is set up, the phone receives a image file over the connection to the wireless network for each conference participant. The software in the phone assigns each image/conference participant to one of the keys 20, 22, 24 and 26. For any keys with programmable displays which are in excess of the number of participants, such keys are blank and do not display an image. For example, in a conference call with three other participants, the phone may appear as shown in FIG. 7, with key 26 blank since there are only three other participants. Key 20 displays a picture of a first conference participant, key 22 displays a picture of a second conference participant, and key 24 displays an image of a third conference call participant.

The phone 10 would obtain the image files for display on the keys 20, 22 and 24 during the conference from a conference server that sets up the conference call, or directly from the other conference participants. As part of the conference call set up process, each participant is prompted to send to the conference server an image file containing a picture of the conference participant and this image file is then distributed to the other conference participants at the start of the conference or when they join the conference.

In an example where the conference is a half-duplex conference (only one speaker has the "floor" at any given moment), the image of the current speaker in the conference is then displayed on the main screen 12 as well. For example, in the situation shown in FIG. 7, the speaker associated with key 20 is currently speaking and thus the main display 12 shows a larger version of the image shown on the key 20. Suppose that speaker relinquishes the "floor" and the speaker associated with key 22 begins talking. The display 12 then displays a larger version of the image which is displayed on the key 22.

U.S. patent application Ser. No. 10/629,360 filed Jul. 29, 2003, assigned to the assignee of this invention, is directed to a method and system for identifying a media source in a real-time media stream or conference. The entire content of the '360 patent application is incorporated by reference herein. The teachings of the '360 application can be used in this invention to identify the conference participant that is currently speaking. Once the conference speaker has been identified, the associated image file of the speaker is then presented on the main display 12 of the phone 10 as shown in FIG. 7.

After the conference call is over, images which are displays on the keys 20, 22 and 24 revert back to the images which were displayed before the conference call was initiated.

In the event that the telephone is used in a conference call in which the number of participants exceeds the number of available keys with programmable displays, the phone may use any suitable algorithm to select which participant images are displayed on the available keys, such as the first ones to call in, the participants are prioritized by user-specified criteria such as by area codes, by identity of the participant, by phone number, or any other method.

Thus, in one form of the invention a wireless telephone 10 is provided which includes telephone circuitry 200 (FIG. 8) for placing and receiving wireless telephone calls; a main display 12; a key (e.g., 20) separate from the main display wherein the key includes a programmable display for displaying an image; and a memory 204 (FIG. 8) storing machine readable instructions (program code 206), wherein the instructions include instructions for displaying an image of a conference call participant on the programmable display (20) when the wireless telephone is engaged in a conference call with the conference call participant, as shown in FIG. 7.

While a number of exemplary aspects and embodiments have been discussed above, those of skill in the art will recognize certain modifications, permutations, additions and sub-combinations thereof as being present in the disclosure. It is therefore intended that the following appended claims and claims hereafter introduced are interpreted to include all such modifications, permutations, additions and sub-combinations as are within their true spirit and scope.

I claim:

1. A wireless telephone, comprising:
   telephone circuitry for placing and receiving wireless telephone calls;
   a main display;
   a hard key separate from the main display operative by a user of the telephone to place a call using the telephone circuitry, wherein the key includes a programmable display for displaying an image file; and a memory storing machine readable instructions allowing a user to select an image file stored in the memory for presentation directly or indirectly on the programmable display;

wherein the image file comprises a video file, and wherein the instructions a) cause a still image from the video file to be presented on the hard key after selection of the video file for presentation on the display, and b) cause the still image to begin moving in accordance with the video file when the hard key is activated by the user.

2. The wireless telephone of claim 1, wherein the telephone further comprises a camera, and wherein the image file comprises a digital photograph captured by the camera.

3. The wireless telephone of claim 1, wherein the hard key comprises a key associated with a speed dial function.

4. The wireless telephone of claim 1, wherein the telephone comprises a plurality of hard keys, each having a programmable display for displaying an image.

5. The wireless telephone of claim 4, wherein the instructions support a conference function wherein an image file of each conference participant is displayed on a separate hard key in the plurality of keys.

6. The wireless telephone of claim 5, wherein the telephone is operative to receive data during a conference identifying a participant in the conference currently speaking and wherein the instructions responsively display the image associated with the conference participant currently speaking on the main display.

7. The wireless telephone of claim 1, wherein the telephone comprises a telephone designed and promoted for use by children, the elderly, or both.

8. A method of facilitating a user of a wireless telephone to place a call from the telephone to a third party, the telephone including a hard key having an associated programmable display and a main display, the hard key separate from the main display, the hard key providing a speed dial function in which a press of the hard key causes a dialing of a phone number, comprising the steps of:
 a) providing a prompt instructing the user to assign an image file to the display associated with the hard key;
 b) providing a prompt instructing the user to assign a phone number to the hard key;
 c) providing instructions in the telephone which cause the image file to be displayed on the display, either directly or indirectly; and
 d) providing telephone circuitry in the phone which places the call to the assigned phone number when the user activates the hard key; and
 wherein the image file comprises a video file, and wherein the method further comprises the steps of causing a still image from the video file to be presented on the hard key and causing the still image to begin moving in accordance with the video file when the hard key is activated by the user.

9. The method of claim 8, further comprising the steps of:
 providing a camera with the telephone and a memory for storing image files of photographs captured by the camera;
 wherein the prompt in a) prompts the user to select a image file from the stored images files.

10. The method of claim 8, wherein the telephone comprises a plurality of hard keys each having an associated programmable display and wherein the steps a), b) and c) allow the user to have each of the of hard keys display a different image file.

11. The method of claim 8, wherein the telephone further includes a conference call functionality, and wherein the method further comprises the step of temporarily disabling the display of the image file when the conference call functionality is invoked on the telephone.

12. The method of claim 11, wherein the method further comprises the step of displaying an image file of a conference call participant on the display of the hard key during the conference call.

13. A wireless telephone comprising:
 telephone circuitry for placing and receiving wireless telephone calls;
 a main display;
 a hard key separate from the main display wherein the hard key includes a programmable display for displaying an image; and
 a memory storing machine readable instructions, wherein the instructions include instructions for displaying an image of a conference call participant on the programmable display when the wireless telephone is engaged in a conference call with the conference call participant;
 wherein the image file comprises a video file, and wherein the instructions a) cause a still image from the video file to be presented on the hard key, and b) cause the still image to begin moving in accordance with the video file when the hard key is activated by the user.

14. The wireless telephone of claim 13, wherein the instructions further include instructions causing the image of the conference participant to be displayed on the main display that is currently speaking during the conference.

15. The wireless telephone of claim 13, wherein the phone includes a plurality of hard keys, each including a programmable display for displaying an image.

* * * * *